April 17, 1945. K. C. VINE 2,373,862
FRAME FOR EYEGLASSES AND THE LIKE
Filed April 8, 1942
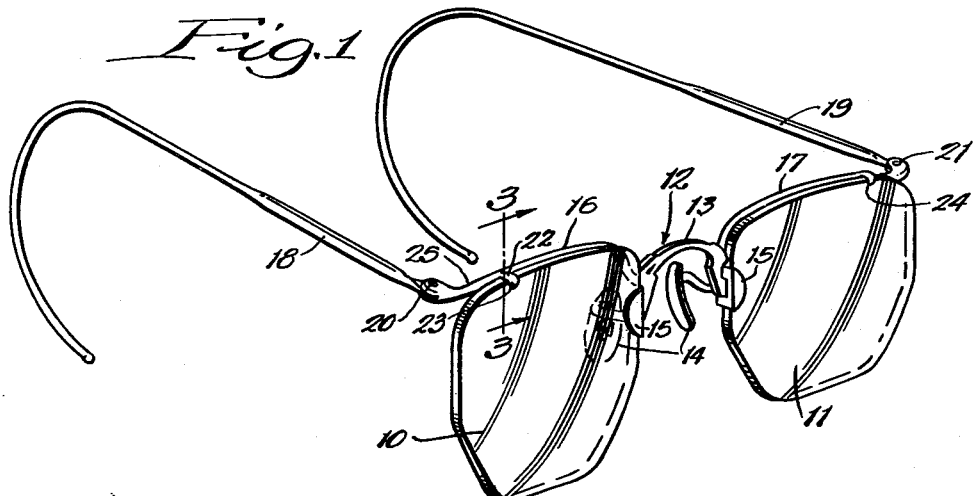
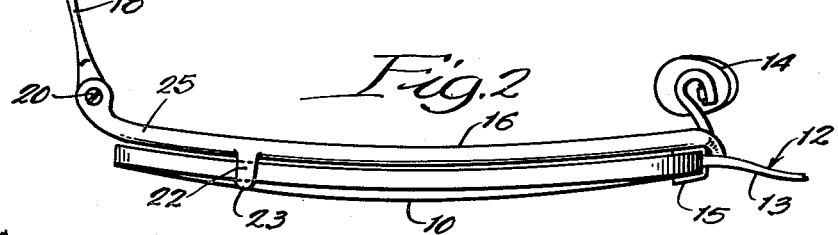
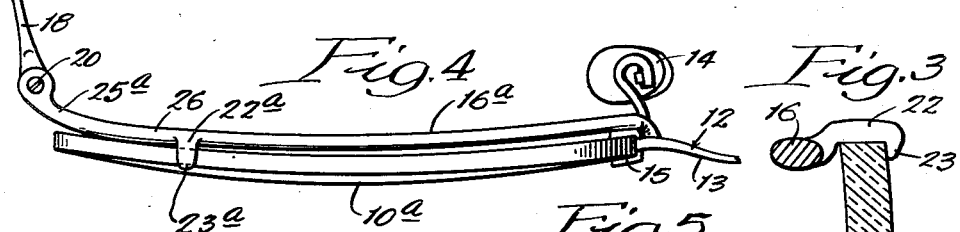
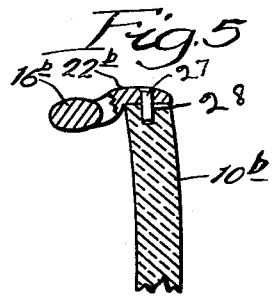
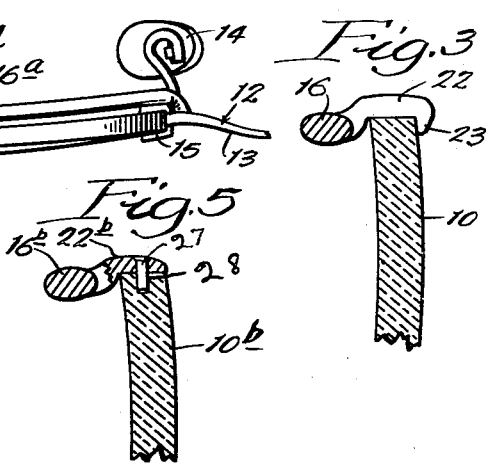
Inventor:
Kemper C. Vine.
By Dawson, Ooms & Booth,
Attorneys.

Patented Apr. 17, 1945

2,373,862

UNITED STATES PATENT OFFICE 2,373,862

FRAME FOR EYEGLASSES AND THE LIKE

Kemper C. Vine, Minneapolis, Minn., assignor to The House of Vision, Belgard-Spero, Inc., Chicago, Ill., a corporation of Delaware Application April 8, 1942, Serial No. 438,164

4 Claims. (Cl. 88—41)

This invention relates to a frame for eyeglasses and the like, and more particularly to a frame equipped with means for securing the frame in fixed relation with respect to the lenses of the eyeglasses so that bending and distortion of the frame in use is substantially avoided.

An object of the invention is to provide a frame for eyeglasses and the like wherein the lenses are rimless, and the frame is nevertheless secured to the lenses in such a manner that distortion and bending of the frame in the use of the eyeglasses is substantially avoided. Another object is to provide a frame which may be secured to the lenses without piercing the same and which may at the same time be readily released from the lenses at at least one point of engagement. Still another object is to provide means for securing the frame to the lenses at at least two spaced portions thereof, the attachment nevertheless not being so rigid as to prevent release of the frame from the lens when the frame or lens is subjected to a blow or a shock. Yet another object is to provide in eyeglasses wherein the lenses are rimless, a frame which extends along the upper portion of the periphery of each of the lenses, the frame being provided with an arm which engages the upper surface of the periphery of the lens and the forward side of the lens adjacent the periphery. Other features and advantages will appear from the following specification and drawing, in which—

Figure 1 is a perspective view of eyeglasses embodying the improved frame structure; Fig. 2 is a plan view of a portion of the structure; Fig. 3 is a fragmentary detail sectional view taken along the line 3—3 of Fig. 1; Fig. 4 is a plan view of a modified form of the invention; and Fig. 5 is a fragmentary detail sectional view of a modified form of the invention.

The invention contemplates a frame for rimless eyeglasses wherein each lens is engaged by the frame at a pair of spaced points and the frame is maintained in fixed relation with respect to the lens so that bending and distortion of the frame is substantially avoided. In this structure, the frame is secured to the lens without piercing of the lens.

In the embodiment of the invention described herein, and referring particularly to Fig. 1, a pair of lenses 10 and 11 of conventional construction are mounted on a nosepiece 12, which includes a bridge 13, side pieces 14 for engaging the nose, and bifurcated pieces 15 secured to the opposite sides of each of the lenses.

Frame members 16 and 17 carried by the nosepiece 12 extend laterally in opposite directions from the nosepiece and extend along the upper portion of the periphery of the lenses 10 and 11 respectively. The frame members 16 and 17 may be made of any suitable material, such, for example, as filled gold, and may be in the form of narrow bars. These frame members are preferably disposed on the rear side of the lenses and are arranged so that at least a portion of each of the frame members is below the upper surface of the adjacent lens. Temple members 18 and 19 of conventional construction are secured to the frame members 16 and 17 respectively and extend rearwardly therefrom, the temple members 18 and 19 being pivotally mounted on the frame members at 20 and 21.

The frame member 16 is equipped with an arm 22 extending forwardly therefrom across and in engagement with the surface of the upper portion of the periphery of the lens 10. The arm 22 is provided at its end with a depending portion or hook 23, which is received in engagement with the forward side of the lens 10 immediately adjacent the upper periphery thereof. Preferably, the arm 22 is secured to the frame member 16 at a point which is spaced substantially away from the nosepiece 12 and, as shown, the arm 22 may be secured to the frame member 16 adjacent the outer end of the frame member. The arm 22 may be integral with the frame member 16 or may be secured to it in any suitable manner.

The eyeglass structure may be assembled by securing the bifurcated pieces 15 of the nose-piece 12 to the inner edges of the lenses 10 and 11. Since this means of attaching the lenses to the nosepiece is already well known, it will not be further described in detail herein. The frame members 16 and 17 are then brought into adjacent relation with the lenses 10 and 11 respectively, and the arm 22 extends across the surface of the upper portion of the periphery of the lens 10. A similar arm 24 extends across the upper portion of the periphery of the lens 11. A hook 23 of the arm 22 and the corresponding hook of the arm 24 engage the forward sides of the lenses 10 and 11 respectively and prevent rearward movement of the frame members 16 and 17 with respect to the lenses 10 and 11. The arms 23 and 24 are also in engagement with the surface of the upper portion of the periphery of the lenses 10 and 11 respectively and prevent downward movement of the members 16 and 17 with respect to the lenses. The frame member 16 is preferably disposed in relation to the lens 10 so that the outer end portion 25 of the frame member 16 is in engagement with or almost in engagement with the rear side of the lens 10. The member 17 is similarly disposed with respect to the lens 11. This prevents any substantial forward movement of the members 16 and 17 with respect to the lenses 10 and 11. By providing for an arm carried by each of the members 16 and 17 at the outer portions thereof, the structure tends also to prevent upward movement of the frame members with respect to the lenses since when one frame member tends to move upwardly, the other frame member would tend to move downwardly with respect to the adjacent lens and the arm extending across the lens would prevent such movement.

With this construction, the lenses are each engaged at two points, namely by the pieces 15 and the arms 22 and 24. The lens is not pierced by any of the supporting members. Although the mounting maintains the frame in fixed relation with respect to the lens and thus tends to avoid any bending or distortion of the frame, nevertheless the mounting is not so rigid as to cause a shattering of the lens by the imparting of a blow or shock to the frame. If the frame is subjected to a sharp blow, the arms 22 and 24 will be released from the lenses 10 and 11 respectively.

In the modified form of the invention shown in Fig. 4, the construction is similar to that of Figs. 1 to 3, except that the frame member 16ᵃ is provided with an outer end 25ᵃ which turns slightly forwardly and downwardly so as to engage the rear side of the lens 10ᵃ before the arm 22ᵃ and the hook 23ᵃ carried thereby can be brought into engagement with the lens. Thus, when the form of frame shown in Fig. 4 is assembled, the frame is moved forwardly toward the lens until the outer end 25ᵃ is brought into engagement with the rear side of the lens 10ᵃ. At this point, the hook 23ᵃ does not quite extend across the upper surface of the lens 10ᵃ, and the frame member 16ᵃ must be urged forwardly at 26 and placed under a slight tension in order to permit the hook 23ᵃ to engage the forward face of the lens 10ᵃ. With this construction, the frame member 16ᵃ, when in assembled relation with respect to the lens 10ᵃ, is under a slight tension and greater rigidity of the structure is provided. Nevertheless, the rigidity is not so great as to prevent the ready release of the arm 22ᵃ from the lens 10ᵃ if the frame is subjected to a blow.

In the modification of the invention shown in Fig. 5, the frame member 16ᵇ is equipped with a forwardly-extending arm 22ᵇ which extends across the upper surface of the periphery of the lens 10ᵇ and in engagement therewith. No hook is provided on the forward end of the arm 22ᵇ and instead a pin 27 carried by the arm 22ᵇ is received within a recess 28 in the upper portion of the lens.

With this construction, the pin 27 carried by the arm 22ᵇ serves to secure the frame member 16ᵇ against forward or rearward movement with respect to the lens 10ᵇ.

Although the invention has been described specifically for the purpose of illustration, it will be understood that many modifications and changes may be made without departing from the spirit and scope of the invention.

I claim:

1. In eyeglasses and the like, a nose-piece, a pair of lenses mounted on opposite sides of said nosepiece, a pair of frame members extending outwardly and laterally in opposite directions from the nosepiece along the respective rear sides of the upper portion of the periphery of the lenses, each of said members being in engagement with the rear side of the adjacent lens at the outer and upper portion thereof and being spaced from the lens at a point spaced slightly inwardly from the point of engagement, an arm carried by the portion of each of the members which is spaced from the lens, said arm extending forwardly across and in engagement with the upper surface of the adjacent lens, a depending portion on the forward end of the arm in engagement with the forward side of the lens adjacent the upper portion of the periphery thereof, the portion of the member to which the arm is secured being held forwardly adjacent the lens by the arm and against a slight rearward tension thereof whereby the lens is releasably gripped by the arm and the member is maintained under slight tension, and temple members pivotally secured to said frame members and adapted to extend rearwardly therefrom.

2. In eyeglasses and the like, a nosepiece, a lens mounted on one side of said nosepiece, a frame member extending outwardly and laterally from the nosepiece along the rear side of the upper portion of the periphery of the lens, said member being in engagement with the rear side of the lens at the outer and upper portion thereof and being spaced from the lens at a point spaced slightly inwardly from the point of engagement, an arm carried by the portion of the member which is spaced from the lens, said arm extending forwardly across and in engagement with the upper surface of the lens, a depending portion on the forward end of the arm in engagement with the forward side of the lens adjacent the upper portion of the periphery thereof, the portion of the member to which the arm is secured being held forwardly adjacent the lens by the arm and against a slight rearward tension thereof whereby the lens is releasably gripped by the arm and the member is maintained under slight tension, and a temple member pivotally secured to said frame member and adapted to extend rearwardly therefrom.

3. In eyeglasses and the like, a pair of lenses, a frame which includes a pair of members extending laterally in opposite directions along the rear sides of the lenses, means attached to the inner edge portions of said lenses for securing the inner ends of said members with the inner portions of said lenses, each of said members being in engagement with the rear side of the adjacent lens and being spaced from the lens at a point spaced inwardly from the point of engagement, an arm carried by the portion of each of the members which is spaced from the lens, said arm extending over the upper edge of the adjacent lens and engaging the forward side of the lens, the portion of the member to which the arm is secured being held forwardly adjacent the lens by the arm and against a slight rearward tension thereof whereby the lens is releasably gripped by the arm and the member is maintained under slight tension, and temple members pivotally secured to said frame members and adapted to extend rearwardly therefrom.

4. In eyeglass structure, a lens, a resilient frame member back of said lens, means for securing the inner end of said frame member with the inner edge portion of said lens, said member engaging the rear side of said lens and being spaced from said lens inwardly of such engagement, and an arm carried by the portion of said member which is spaced from said lens, said arm extending over the top edge of said lens and engaging the front side thereof, said spaced portion of the frame member being urged slightly forwardly by said arm through engagement of the arm with the front side of the lens to thereby hold the frame member resiliently against the lens at its point of engagement with the lens.

KEMPER C. VINE.